US006405362B1

(12) United States Patent
Shih et al.

(10) Patent No.: US 6,405,362 B1
(45) Date of Patent: Jun. 11, 2002

(54) AUTOMATIC SOFTWARE INSTALLATION AND CLEANUP

(75) Inventors: Yung-Ho Shih; Yongqi Yang, both of Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/192,040

(22) Filed: Nov. 13, 1998

(51) Int. Cl.[7] .................................................. G06F 9/445
(52) U.S. Cl. ................................................ 717/11; 713/1
(58) Field of Search .......................... 717/11, 4; 713/1, 713/2, 100, 200, 187, 188, 189, 191

(56) References Cited

U.S. PATENT DOCUMENTS

| | | | | |
|---|---|---|---|---|
| 5,642,417 A | * | 6/1997 | Stringer ........................... | 380/4 |
| 5,892,953 A | * | 4/1999 | Bhagria et al. ............. | 395/712 |
| 5,953,532 A | * | 9/1999 | Lochbaum .................. | 395/712 |
| 6,049,663 A | * | 4/2000 | Harikrishnan et al. . | 395/500.43 |

OTHER PUBLICATIONS

Williams, "32–bit operating system rises to challenge Windows CE", Electronic Design, Sep. 1997, pp. 144–146.*
Ruley, "Upgrading to CE 2.,0", Windows Magazine, Dec. 1997, pp. 309–3121.*
Delzotto, "Utility software: Get rid of unwanted Windows programs", Accounting Technology, Oct. 1995, pp. 59.*
Andrews et al., "Windows Utilities: Rx for your PC", PC World Online, Jun. 1998, pp. 1–19.*
Jasco, "Multimedia in Windows 95", Computers in Libraries, Nov. 1995, p. 63.
Yegulalp, "Norton painlessly removes programs", Windows, Magazine, Apr. 1998, p. 134.
Gussin, "Microsoft's Windows 95 multimedia initiative", CD–ROM Professional, Aug. 1995, p. 20.

* cited by examiner

Primary Examiner—Kakali Chaki
(74) Attorney, Agent, or Firm—Lee & Hayes, PLLC

(57) ABSTRACT

Automatically installing a software application and automatically removing and releasing resources used by the application is disclosed. In one embodiment of the invention, the computerized system includes an operating system for controlling and maintaining resources on a computer; and an event monitor. The event monitor invokes an autorun program in response to a signal from the operating system that a computer-readable medium has been inserted into the computer. The event monitor also invokes the autorun program upon receipt of a signal that the computer readable medium has been removed from the computer. The autorun program installs an application from the computer readable medium when the medium is inserted and releases resources acquired by the application when the medium is removed.

20 Claims, 3 Drawing Sheets

AUTOMATIC SOFTWARE INSTALLATION AND CLEANUP

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, Microsoft Corporation, All Rights Reserved.

FIELD OF THE INVENTION

This invention relates generally to software installation, and more specifically to automating the installation and cleanup of software applications.

BACKGROUND OF THE INVENTION

The rapid evolution of personal computer technology continues to produce personal computers that are smaller, cheaper and faster than their predecessors. Where computers once occupied entire rooms, they are now small enough to fit in the palm of the hand, hence the name "Palm-size PCs".

The reduced size of the Palm-size PC means that certain sacrifices need to be made. For example, a typical Palm-size PC does not have fixed or removable disk drives such as hard disk, floppy disk, CD-ROM or DVD-ROM drives, with the persistent storage of a typical Palm-size PC comprising flash memory or volatile memory with a battery refresh. In addition, the amount of RAM in the typical Palm-size PC is also limited, resulting in specialized operating systems capable of running in the resource-limited environment of the Palm-size PC. An example of such an operating system is the Windows CE™ operating system from Microsoft Corporation. Applications running on the Palm-size PC must also be capable of running in the resource limited environment described above. Applications running on the Palm-size PC are typically specialized versions of applications available on the bigger siblings of the Palm-size PC, such as calendar programs, personal information managers, calculators, dictionaries and the like.

In many markets, the Palm-size PC is typically a companion PC to a desktop or other larger PC. Having a desktop PC available allows new or updated application software to be delivered to a Palm-size PC by downloading the software to the Palm-size PC from the desktop PC through a communications link between the two systems.

However, in certain, typically less developed markets, ownership of desktop PCs is not common, and a Palm-size PC may be the only PC that the user has access to. As a result, the ability to deliver software to a Palm-size PC on a Compact Flash or PCMCIA memory card has been developed as an alternative to downloading software from a desktop PC. This mechanism has the advantage that a companion desktop PC is no longer required in order to update or load new software, however several problems remain.

A first problem is that Palm-size PCs do not typically provide an interface allowing a user to discover what software is available on the Compact Flash card. For example, a desktop or larger PC will typically have what is known in the art as a browser. Browsers display the files that reside on the file system of a disk or other memory device and provide the capability for a user to "browse" through file systems to locate files. Among these files are executable software applications. Because the Palm-size PC has limited memory resources, browsers are not typically provided. Thus, the user has no way of locating any executable application files that may exist on the Compact Flash or PCMCIA memory card.

A second problem is that no "cleanup" takes place when the Compact Flash card is removed. An application that has been installed on a Palm-size PC consumes some of the resources of the PC. Typically, these resources include memory to hold the application and its data, display space to display icons and program output from the application. In addition, operating system resources are also consumed in the form of registry entries, process table entries and the like. Because the Palm-size PC has limited resources to begin with, it is important that these resources be released when they are no longer needed. However, there is currently no mechanism provided to detect that these resources can be freed.

The above-described problem is exacerbated when the Compact Flash card is repeatedly inserted and removed. In this case, each insertion of the memory card will cause additional resources to be consumed, which are not freed when the card is removed. Eventually the available resources will be depleted to the point where either the performance of the Palm-size PC is severely degraded or the PC crashes.

A third problem is related to the way that PCs, both Palm-size and desktop, access Compact Flash cards. Typical software distribution media, such as CD-ROM, floppy and hard disk drives, are accessed through a software driver which can determine if the media is present and take appropriate action if it is not. However, Compact Flash cards are accessed differently in some operating systems. For example, in operating systems for resource limited environments, the Compact Flash Card is typically accessed directly by the CPU as if it is part of the main memory of the system. Operating systems for desktop PC environments also are capable of direct access, but do so to a lesser extent. Thus, software on a PC may make direct references to the memory on the Compact Flash card without going through a device driver. If the card is removed while the software is running, these references will be to addresses in memory that no longer exists. This typically causes the application to receive what is known in the art as an exception, and can cause the software to crash. In addition, references to non-existent memory can potentially cause other applications or the operating system itself to crash. While it is possible for an application to attempt to check for the presence of the Compact Flash card with every memory reference, such a check is not 100% reliable, and the impact on the performance of the system makes this solution impractical.

A final issue that must be addressed is the fact that Palm-size PCs from differing manufacturers use differing types of CPUs. For example, CPUs from MIPS, NEC and Hitachi have been used in various Palm-size PCs. Each of these CPUs has their own instruction set, and software applications intended for a particular type of CPU must use the instruction set for the CPU it will be run on. In order for a single Compact Flash memory card to deliver software for a variety of Palm-size PCs, multiple versions of the software must be stored on the card.

Thus, there is a need for a system for automatically cleaning up and releasing resources acquired by software delivered on a Compact Flash memory. There is also a need for a system that installs the software without requiring the use of a browser. Finally, there is a need for such a system that supports multiple hardware environments.

SUMMARY OF THE INVENTION

A system and method for automatically cleaning up and releasing resources acquired by a software application is described. The system includes an event monitor that detects when a Compact Flash memory card containing software to be installed has been inserted or removed. Upon insertion of a Compact Flash card into a slot in a Palm-size PC, the event monitor receives an event indicating the insertion, and searches the Compact Flash card for an autorun program, which is invoked to install the software on the card. One aspect of the invention is that the event monitor locates the autorun program by searching in architecture specific directories on the Compact Flash card.

Upon removal of the Compact Flash card, the event monitor receives an event indicating the removal. The event monitor then invokes the autorun program with an uninstall parameter to cause the program to terminate the installed application, and free or release resources acquired during the installation process. Among these resources are registry entries, configuration files, display icons etc.

Because a cleaning program can be automatically invoked, resources can be automatically cleaned up after an application has been installed from a Compact Flash card. The potential for application or system crashes caused by referencing memory on the card when it is no longer present is reduced. In addition, limited resources of the Palm-size PC are freed for use by other applications and programs. Finally, because the installation process is automatically performed when the card is inserted, there is no need for a browser program.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system level overview of the invention is presented. In the third section, a method for automatically freeing resources used by application software delivered on a computer-readable medium is presented. Finally, in the fourth section, a conclusion of the detailed description is provided.

Hardware and Operating Environment

Figure 1:
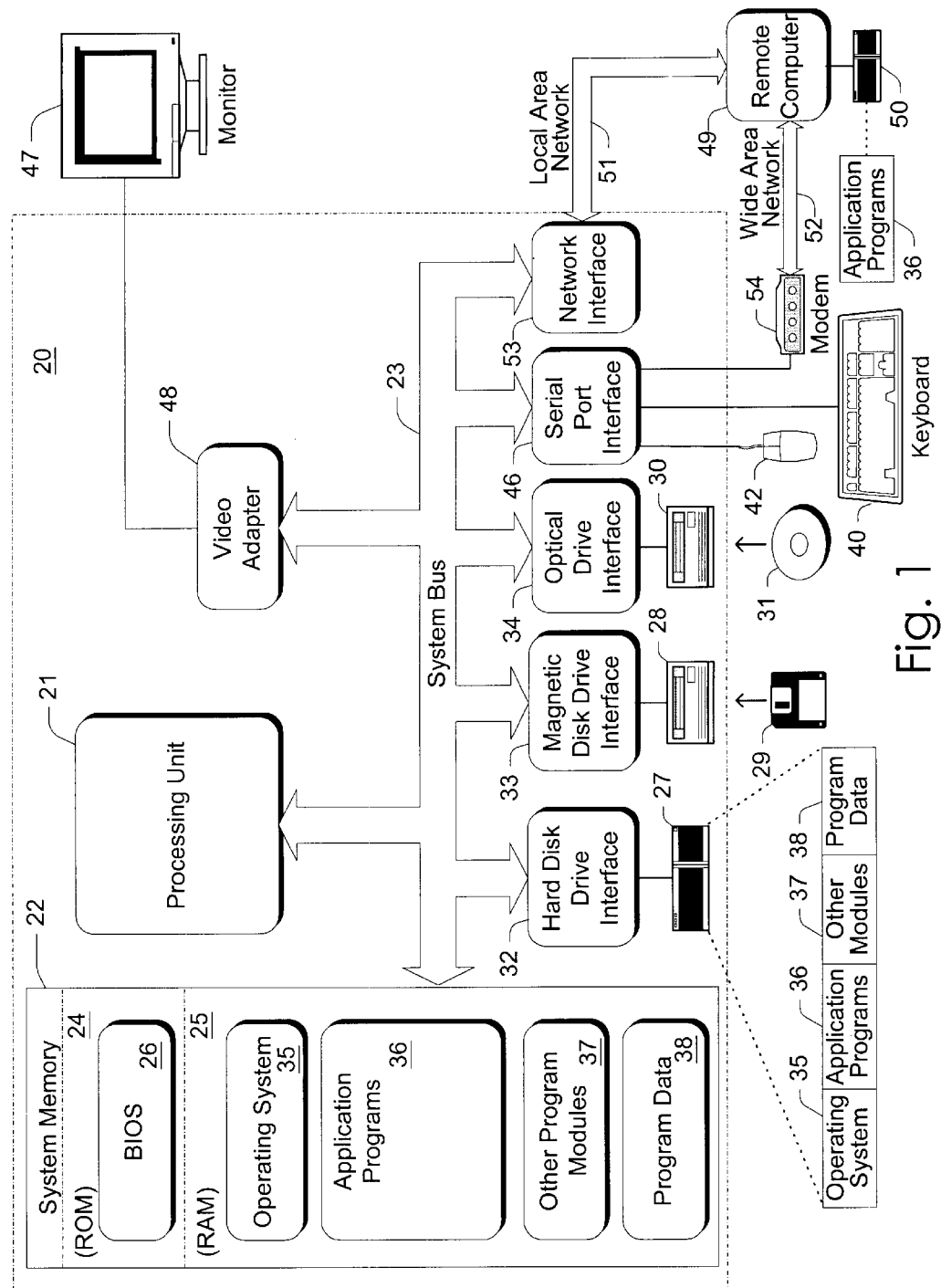
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
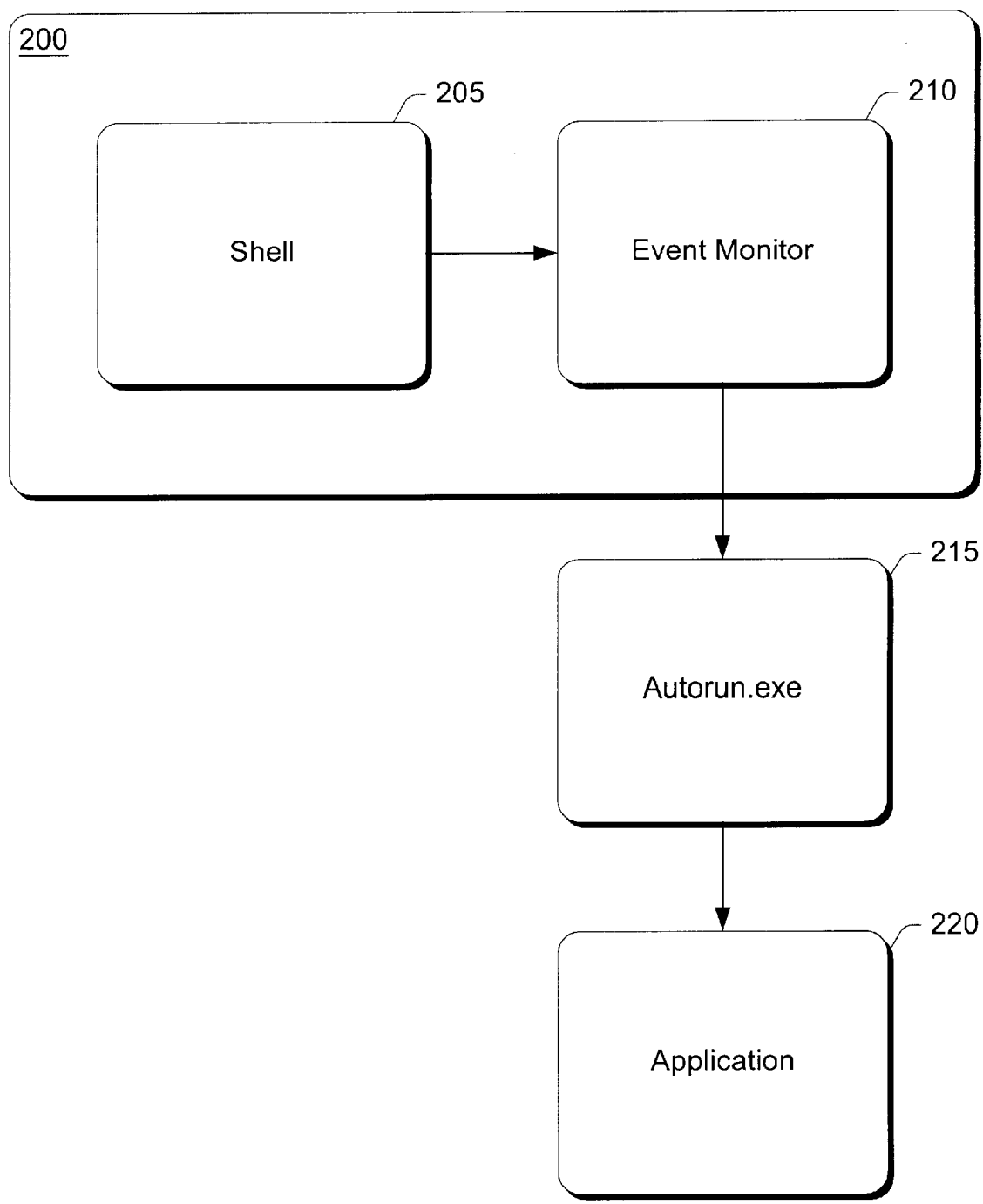
FIG. 2 is a diagram showing the major components of a software system of one embodiment of the invention.

FIG. 2 presents a block diagram overview of a system in which an embodiment of the invention resides. Included in the system are operating system 200, shell 205, event monitor 210, autorun program 215 and application 220. Application 220 is a software application that is delivered on a Compact Flash card and is designed for use on the Palm-size PC. Examples of such applications include word processors, calendar programs, dictionary programs, calculators, and personal information managers. These application programs are typically versions of applications available for desktop PCs that have been modified to run in the resource limited environment of the Palm-top PC. A particular Compact Flash card may contain several different applications, and it may contain multiple versions of an application.

Operating system 200 comprises a set of software modules designed to control and manage the resources of a computer system. In one embodiment of the invention, operating system 200 is the Windows CE operating system from Microsoft Corporation.

Shell 205 is a software module running under operating system 200. Shell 205 typically provides a portion of the user interface for the operating system. A typical shell program will receive and process numerous type of events, including icon selection, menu selection, and in the case of some Palm-size PCs, command lines entered via a handwriting recognition engine. In one embodiment of the invention, two of the events that the shell 205 receives from the operating system 200 are an event indicating that a removable computer-readable medium was inserted, and an event indicating that a computer-readable medium was removed. In the embodiment where the operating system is the Windows CE operating system, these events are implemented as messages and are labeled "SHCNE_DEVICEADD" and "SHCNE_DEVICEREMOVE".

In one embodiment of the invention, an event monitor 210 is invoked by shell 205. After invocation, the event monitor 210 waits until it is notified by shell 205 that a Compact Flash, PCMCIA memory card, or other removable computer-readable medium has been either inserted in or removed from the Palm-size PC. In the embodiment of the invention where the operating system is the Windows CE operating system, the shell 205 notifies the event monitor 210 by sending an "ARM_INSERT" or an "ARM_REMOVE" message to indicate the insertion or removal of the computer-readable medium. In this embodiment, it is desirable to specify what is known in the art as a handler for each of above messages. A handler is a function within the event monitor specifically designed to be executed when a certain type of message is received.

In response to an insertion message, event monitor 210 searches the computer-readable medium that was just inserted for an "autorun" program 215, which in one embodiment of the invention is called "autorun.exe". In order to accommodate multiple system architectures with differing CPU types, the computer-readable medium may contain multiple versions of the autorun program 215. Each version of the program is for a particular system and/or CPU and is located in a sub-directory of the file system on the computer-readable medium containing programs and files for the particular system and/or CPU. For example, in one embodiment of the invention, the autorun program for a Palm-size PC using the SH-3 CPU from Hitachi Semiconductor (America) Inc. is located in a subdirectory with a path name of "\Flash Card\SH3". Generally, the label "Flash Card" is the path name constructed by the operating system to refer to the Compact Flash card, and "SH3" is a top-level directory on the file system resident on the Compact Flash card. Similarly, the autorun program for a Palm-size PC with a MIPs CPU is located in the "\Flash Card\MIPS" subdirectory. Other CPUs include those from Intel and NEC, and the autorun program for each is located in a corresponding directory in the file system. Those of ordinary skill in the art will recognize that alternative path names or other mechanisms could be used to specify an architecture specific location for a particular executable file. For example, the "Flash Card" component of the path name specified above may be replaced by a different name to specify a file system on a Compact Flash card. In addition, alternative labels for the various CPU types may be used and are within the scope of the invention.

After locating the appropriate autorun program 215, the event monitor 210 runs the program, passing it a command line indicating that it is to install and/or run the application 220 on the computer-readable medium.

If the message is a removal message, the event monitor 210 locates the appropriate autorun program 215 as described above. It then runs the program, passing it a command line indicating that it is to remove the application 220 from the operating memory of the Palm-size PC, and that resources used by the application are to be freed for re-use by other applications.

It is desirable to provide an event monitor 210, because it reduces the amount of processing that shell 205 must perform when a computer-readable medium is inserted or removed and allows for proper serialization of the insertion and removal events. Processing by shell 205 is reduced, because it merely passes along the notification to event monitor 210 that a computer-readable medium has been inserted or removed. Event monitor 210 performs the majority of the work related to the event, allowing shell 205 to respond to other requests in a timely manner.

It is also desirable that event monitor 210 serialize the insertion and removal messages. This allows the events to be processed in the proper order. This is important when a Compact Flash card is inserted and removed multiple times. Each insertion and removal must be handled as a separate event and in the proper order, otherwise system corruption can occur.

In addition, it is also desirable that the event monitor 210 be implemented as what is known in the art as a thread. This is because a thread generally makes more efficient use of a system's resources than a typical process.

Autorun program 215 is a program developed and provided by the developer of application 220. In one embodiment of the invention, the program has two major operational modes which are specified as command parameters. In the first mode, autorun program 215 installs and/or runs application 220 software from a Compact Flash card. In this mode, the program performs setup functions such as setting registry entries, inserting a tray icon for application 220 in the task bar and copying the application from the Compact Flash card to the operational memory of the Palm-size PC.

In the second mode, autorun program 215 terminates the application upon receiving notification that the Compact Flash card has been removed, and performs cleanup functions such as removing registry entries, removing the icon for the application from the task bar, and frees any memory allocated to the application.

The above-described components operate together as follows. An application developer produces an application 220 that can be run on the Palm-size PC. In addition, the developer produces an autorun program 215 that is capable of executing installation and cleanup procedures. In one embodiment of the invention, the application 220 and autorun program 215 are placed in an architecture specific directory on a Compact Flash memory card for delivery to end-users.

When the end-user starts, or boots the Palm-size PC, the PC's operating system 200 starts a shell process 205. Shell process 205 in turn starts an event monitor thread 210, which waits for a message from the shell process.

When the end-user inserts a Compact Flash memory card containing the application, the operating system, or a component thereof, detects the insertion and notifies shell process 205 of the insertion. Shell process 205 in turn notifies event monitor 210 of the insertion and returns to processing other user interface events. Event monitor 210 then searches for the Compact Flash memory card, and the appropriate architecture specific autorun program 215, and executes the program. The autorun program performs any necessary setup for the application (described above), and then waits.

Upon removal of the Compact Flash memory card, the operating system, or a component thereof, detects the removal and notifies shell process 205 of the removal. Shell process 205 then notifies event monitor 210 of the removal, which sends an uninstall parameter to the autorun program. The autorun program then terminates application 220, removes it from memory and frees any resources used by the application 220.

The above described process is repeated every time a user inserts or removes a Compact Flash memory card.

Method for Performing Automatic Cleanup

The previous section presented a system level description of an embodiment of the invention. In this section, a method within an embodiment of the invention will be described with reference to a flowchart describing steps to be performed by computer programs implementing the method using computer-executable instructions. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, or Compact Flash (CF) card for distribution, installation and execution on another (suitably equipped) computer. The programs may also be stored on one computer system and transferred to another computer system via a network connecting the two systems, thus at least temporarily existing on a carrier wave or some other form of transmission.

Figure 3:
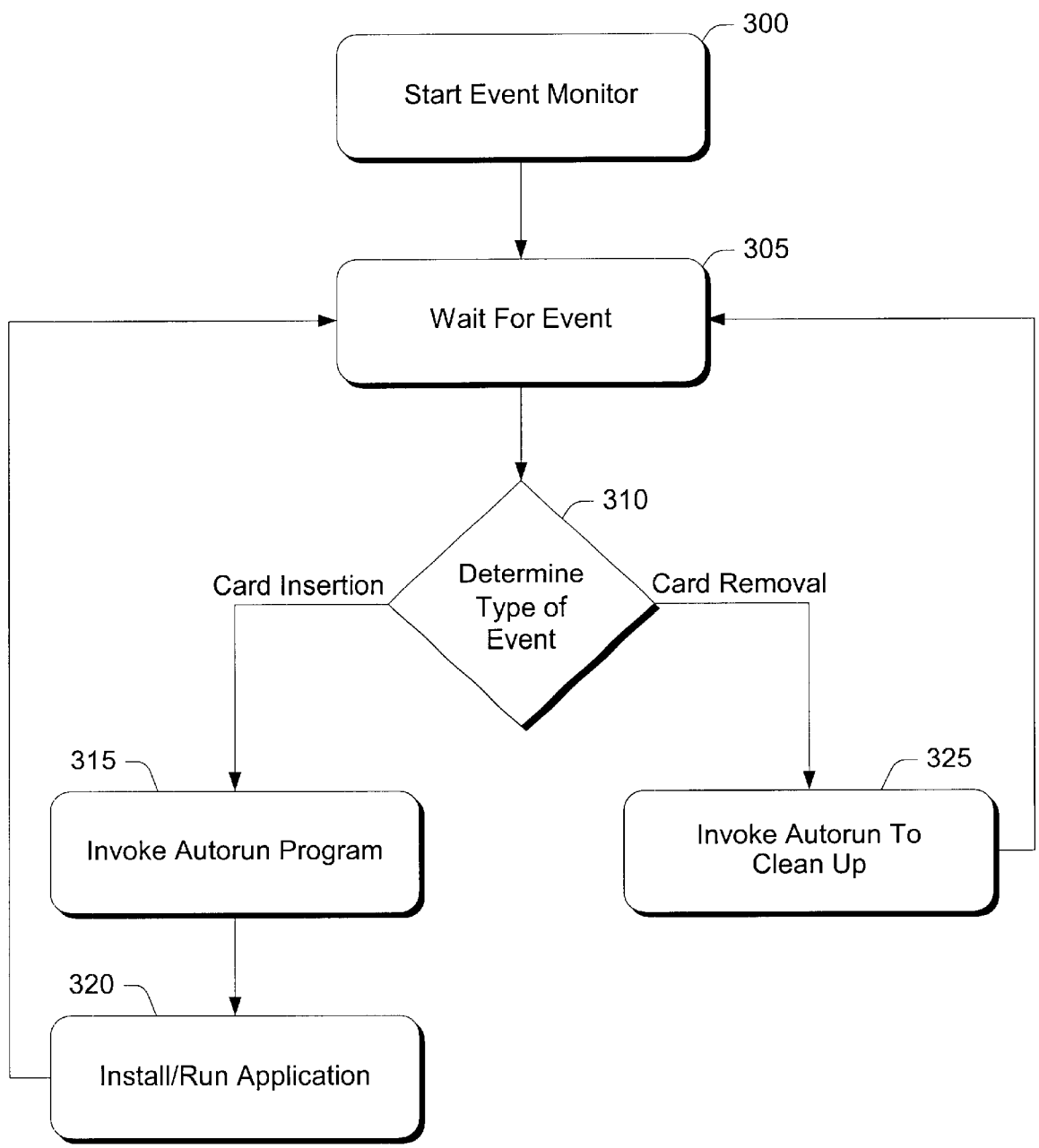
FIG. 3 is a flowchart illustrating a method according to one embodiment of the invention.

In FIG. 3, a flowchart is shown that illustrates a method for automatically freeing resources and performing other clean up activities on a Palm-size PC. The method begins at 300, where an event monitor program is started. The event monitor performs any required initialization, such as setting up message queues and handlers to receive events.

Next at 305, the method waits for an event to be detected. In one embodiment of the invention, the mechanism used to indicate an event is the sending and receiving of a predetermined message. Specifically, in the Windows CE operating system, the SHCNE_DRIVEADD and ARM_INSERT messages indicate that a Compact Flash card has been inserted, and the SHCNE_DRIVEREMOVE and ARM_REMOVE messages indicate that a Compact Flash card has been removed. Other mechanisms for declaring an event are possible and within the scope of the invention. For example, in an alternative embodiment of the invention, an event is declared by setting a semaphore. In a further embodiment of the invention, setting a value in a shared memory location is used to declare an event. In a still further alternative embodiment, generating a pre-determined interrupt indicates an event has occurred. In yet another embodiment, an event is declared by generating an operating system signal. Each of the above-described mechanisms is known in the art and can be used to indicate a particular event.

After an event is detected, the method proceeds to 310 to determine the type of event that occurred. Two types of events, insertion and removal of a Compact Flash memory card, are of particular interest. If the event is the insertion of a Compact Flash card, the method proceeds to 315 to invoke an autorun program with a parameter indicating that an installation is to be performed. In one embodiment of the invention, the method searches a file system on the Compact Flash memory card for a particular, architecture specific, autorun program.

The method then proceeds to 320, where the autorun program invoked at 315 performs an installation of one or more software applications resident on the Compact Flash memory card. As part of the installation, the autorun program performs tasks such as copying the application into the computer's operational memory, setting appropriate registry entries, initializing configuration files, and entering icons onto the display. Following the installation, the method returns to 305 to wait for the next significant event, which will generally be the removal of the Compact Flash memory card.

If the event type determined at 310 was the removal of a Compact Flash memory card, the method then proceeds to 325. Here, the autorun program that was invoked at 315 is invoked again, this time with a parameter indicating that a cleanup, or uninstall, is to be performed. The method terminates any applications installed and started at 320. In addition, the method releases resources acquired during the installation and running of the application, such as registry entries, display icons, and configuration files. Removing these items eliminates potential references to the Compact Flash memory, thereby reducing the potential for inadvertent system crashes caused by attempting to read memory that is no longer present. In addition, releasing the resources acquired during the installation and running of the application allows other programs and applications to use the resources, thereby conserving resources in a resource limited environment. After releasing the resources, the method proceeds to 305 to wait for the next event.

Conclusion

A method for performing automatic installation and cleanup of applications delivered on computer-readable media has been disclosed. In particular, the automatic cleanup of resources used by an application upon removal of a Compact Flash memory card has been disclosed. Although specific embodiments have been illustrated and described herein, it will be appreciated by those of ordinary skill in the art that any arrangement which is calculated to achieve the same purpose may be substituted for the specific embodiments shown. For example, the automatic installation and cleanup of applications delivered on a Compact Flash memory card has been disclosed, however other system and methods of the invention can be readily applied to other types of removable computer-readable media. The use of alternative computer-readable media such as PCMCIA memory cards, 3.5" floppy disks, and CD-ROM disks is within the scope of the invention.

In addition, the environment in which the various embodiments of the invention operate has been described in terms of the Palm-size PC. However, the invention is not so limited. The system and methods of the invention can be implemented in any environment where the use of resources is a concern, including laptop PCs, desktop PCs and other systems. One example occurs in the general software installation context where a user desires perform what is commonly referred to in the art as a "minimal" installation, i.e. only installing that software which is absolutely required to run the application. The system and methods of the invention could be adapted to such a minimal installation.

Also, the functionality provided by the autorun program can be distributed into multiple component programs that are invoked by the event monitor. For example, one component program could perform the installation, and a separate component program could perform the removal and cleanup.

This application is intended to cover any adaptations or variations of the present invention. Therefore, it is manifestly intended that this invention be limited only by the following claims and equivalents thereof.

We claim:

1. A method for automatically releasing resources used by an application, said resources maintained by a computer having an operating system, the method comprising:

detecting the removal of a computer-readable medium from the computer; and removing an application previously installed from the computer-readable medium and releasing at least a subset of the resources acquired by the application;

wherein removing the application further comprises signaling an autorun program to remove the application, said signal comprising an action selected from the group consisting of: sending a pre-defined message to the autorun program, setting a semaphore, setting a value in a shared memory location, and issuing an operating system signal.

2. A method for automatically installing to a computer and removing from the computer a software application on a computer-readable medium, the method comprising:

starting an event monitor;

detecting by the event monitor the insertion of the computer-readable medium;

starting an autorun program to install the software application;

detecting by the event monitor the removal of the computer-readable medium; and signaling the autorun program to remove the software application and release at least a subset of the resources acquired by the software application, said signaling occurring from the event monitor to the autorun program.

3. The method of claim 2, wherein the computer is a Palm-size PC.

4. The method of claim 2, wherein the computer-readable medium is selected from a group consisting of: Compact Flash memory card, PCMCIA memory card, CD-ROM, and 3.5" floppy disk.

5. The method of claim 2, wherein signaling the autorun program further comprises performing an action selected from the group consisting of: sending a pre-defined message to the autorun program, setting a semaphore, setting a value in a shared memory location, and issuing an operating system signal.

6. A first computer-readable medium having computer-executable instructions to perform a method for releasing resources acquired by an application installed on a computer having an operating system, the method comprising:

detecting the removal of a second computer-readable medium from the computer; and removing an application previously installed from the second computer-readable medium and releasing at least a subset of the resources acquired by the application;

wherein removing the application further comprises signaling an autorun program to remove the application, said signal comprising an action selected from the group consisting of: sending a pre-defined message to the autorun program, setting a semaphore, setting a value in a shared memory location, and issuing an operating system signal.

7. A first computer-readable medium having computer-executable instructions to perform a method for automatically installing to a computer and removing from the computer a software application on a second computer-readable medium, the method comprising:

starting an event monitor;

detecting by the event monitor the insertion of the computer-readable medium;

starting an autorun program to install the software application;

detecting by the event monitor the removal of the computer-readable medium; and signaling the autorun program to remove the software application and release at least a subset of the resources acquired by the software application, said signaling occurring from the event monitor to the autorun program.

8. The first computer-readable medium of claim 7, wherein the computer is a Palm-size PC.

9. The first computer-readable medium of claim 7, wherein the second computer-readable medium is selected from a group consisting of: Compact Flash memory card, PCMCIA memory card, CD-ROM, and 3.5" floppy disk.

10. The first computer-readable medium of claim 7, wherein signaling the autorun program further comprises performing an action selected from the group consisting of: sending a pre-defined message to the autorun program, setting a semaphore, setting a value in a shared memory location, and issuing an operating system signal.

11. A computerized application installation and removal system comprising:

an operating system for controlling and maintaining resources on a computer; and an event monitor that invokes an autorun program in response to a signal from the operating system that a computer-readable medium has been inserted into the computer and a signal that the computer readable medium has been removed from the computer, said autorun program operative to install an application from the computer readable medium when the medium is inserted and release resources acquired by the application when the medium is removed.

12. The system of claim 11, wherein the operating system is a version of the Microsoft Windows CE operating system.

13. The system of claim 11, wherein the signal comprises an action selected from the group consisting of: sending a pre-defined message to the autorun program, setting a semaphore, setting a value in a shared memory location, and issuing an operating system signal.

14. The system of claim 11, wherein the computer is a Palm-size PC.

15. The system of claim 11, wherein the computer-readable medium is selected from a group consisting of: Compact Flash memory card, PCMCIA memory card, CD-ROM, and 3.5" floppy disk.

16. A computer comprising:

a processor;

a first computer-readable medium;

an operating system executed by the processor from the first computer-readable medium, said operating system operative to control and maintain resources;

an event monitor that invokes an autorun program in response to a signal from the operating system that a second computer-readable medium has been inserted into the computer and a signal that the second computer readable medium has been removed from the computer, said autorun program operative to install an application from the second computer readable medium when the medium is inserted and release resources acquired by the application when the second computer readable medium is removed.

17. The computer of claim 16, wherein the operating system is a version of the Microsoft Windows CE operating system.

18. The computer of claim 16, wherein the signal comprises an action selected from the group consisting of: sending a pre-defined message to the autorun program, setting a semaphore, setting a value in a shared memory location, and issuing an operating system signal.

19. The computer of claim 16, wherein the computer is a Palm-size PC.

20. The computer of claim 16, wherein the second computer-readable medium is selected from a group consisting of: Compact Flash memory card, PCMCIA memory card, CD-ROM, and 3.5" floppy disk.

* * * * *